US012796805B2

(12) United States Patent
Zheng

(10) Patent No.: US 12,796,805 B2
(45) Date of Patent: Nov. 17, 2026

(54) TABLE WITH LIGHT STRIP

(71) Applicant: ODK TECHNOLOGY PTE.LTD., Singapore (SG)

(72) Inventor: Hongbing Zheng, Hangzhou (CN)

(73) Assignee: ODK TECHNOLOGY PTE.LTD., Singapore (SG)

( * ) Notice: Subject to any disclaimer, the term of this patent is extended or adjusted under 35 U.S.C. 154(b) by 131 days.

(21) Appl. No.: 18/783,625

(22) Filed: Jul. 25, 2024

(65) Prior Publication Data

US 2025/0248513 A1 Aug. 7, 2025

(30) Foreign Application Priority Data

Feb. 7, 2024 (CN) ......................... 202420288451.9

(51) Int. Cl.
*A47B 3/06* (2006.01)
*A47B 13/08* (2006.01)
(Continued)

(52) U.S. Cl.
CPC ................ *A47B 3/06* (2013.01); *A47B 13/08* (2013.01); *A47B 95/00* (2013.01); *F21S 4/20* (2016.01);
(Continued)

(58) Field of Classification Search
CPC ........... A47B 3/06; A47B 13/08; A47B 95/00; A47B 2220/0077; F21S 4/20; F21V 33/0012
USPC .............. 108/23, 65, 69, 12, 19, 155, 157.1, 108/158.11; 362/125, 133, 329, 33; 248/188, 188.1
See application file for complete search history.

(56) References Cited

U.S. PATENT DOCUMENTS 1,229,458 A * 6/1917 Hinsdill ................. A47B 13/12 362/90
2,943,897 A * 7/1960 Johnson ................... B25H 1/00 108/23
(Continued)

FOREIGN PATENT DOCUMENTS

CN 205682772 * 11/2016
CN 107467896 A * 12/2017 ............. A47B 13/00
(Continued)

OTHER PUBLICATIONS

CN107467896 English translation (Year: 2017).*
(Continued)

*Primary Examiner* — Janet M Wilkens
(74) *Attorney, Agent, or Firm* — IPRTOP LLC

(57) ABSTRACT

A table, comprising: a tabletop, a table leg assembly, and a light strip. The tabletop comprises a first table board and a second table board detachably connected to each other. Both ends of the light strip are placed on the table leg assembly and the light strip is disposed between the first table board and the second table board. A secure fixing of the light strip can be realized by the compression force in the horizontal direction between the first table board and the second table board, therefore, the need for adhesive tape and forming grooves on the tabletop is eliminated. Moreover, this table structure allows for easy installation and replacement of the light strip while also enabling dual-sided illumination, providing a good decorative effect.

9 Claims, 4 Drawing Sheets

(51) Int. Cl.
*A47B 95/00* (2006.01)
*F21S 4/20* (2016.01)
*F21V 33/00* (2006.01)

(52) U.S. Cl.
CPC .. *F21V 33/0012* (2013.01); *A47B 2220/0077* (2013.01)

(56) References Cited

U.S. PATENT DOCUMENTS

| | | | | | |
|---|---|---|---|---|---|
| D925,950 | S * | 7/2021 | Zhou | D6/656.16 |
| 11,592,171 | B1 * | 2/2023 | Mckay | B29C 70/683 |
| D1,013,423 | S * | 2/2024 | Vorob'ev | D6/656.16 |
| 2007/0074481 | A1 * | 4/2007 | Stoller | A47B 13/06 52/837 |
| 2007/0277710 | A1 * | 12/2007 | Gray | A47B 13/088 108/65 |
| 2015/0182038 | A1 * | 7/2015 | Wiemer | F21V 23/001 362/225 |
| 2016/0312994 | A1 * | 10/2016 | Wang | A47C 31/00 |
| 2023/0363528 | A1 * | 11/2023 | Fauzan | A47B 13/12 |

FOREIGN PATENT DOCUMENTS

| | | | | |
|---|---|---|---|---|
| CN | 209268893 U * | 8/2019 | |
| CN | 111557544 A * | 8/2020 | F21V 33/0012 |
| CN | 220403432 U * | 1/2024 | |
| DE | 202011001490 U1 * | 6/2012 | A47B 21/06 |

OTHER PUBLICATIONS

CN209268893 English abstract (Year: 2019).*
CN220403432 English abstract (Year: 2024).*
CN205682772 Abstract, claims and figure (Year: 2016).*

* cited by examiner

TABLE WITH LIGHT STRIP

FIELD OF THE INVENTION

The present disclosure relates to the field of furniture, in particular to a table.

BACKGROUND OF THE INVENTION

In the world of modern living, furniture like gaming desks and square tables have become essential. With the increasing richness of indoor living and the growing demand for personalized spaces, tables with LED light strips are becoming more popular, enhancing the ambiance of the environment. However, most tables with added light strips have them attached to one side of the tabletop, resulting in a single-directional light, making them prone to dirt, detachment, and limiting multi-directional illumination and permanent fixation.

Therefore, finding a solution to conveniently and securely fix light strips on a single-layer tabletop is urgently needed.

SUMMARY OF THE INVENTION

The present disclosure provides a table, solving the problem of an insecure fixing of the light strip or a cumbersome fixing process.

In a first aspect of the present disclosure, a table is provided. The table comprises a tabletop, a table leg assembly, and a light strip. The tabletop comprises a first table board and a second table board, wherein the first table board and the second table board are detachably connected. Both ends of the light strip are placed on the table leg assembly and the light strip is disposed between the first table board and the second table board.

In an embodiment of the present disclosure, the table leg assembly comprises an upper support member and a lower support member, wherein the upper support member is mounted on the side of the tabletop facing the ground, and the lower support member is connected to the upper support member by a fastener for providing an upward support force to the tabletop.

In an embodiment of the present disclosure, the upper support member has a rectangular structure, and the lower support member comprises an even number of support rods, wherein the support rods are uniformly fixed on opposite sides along the circumference of the rectangular structure.

In an embodiment of the present disclosure, the lower support member includes four support rods.

In an embodiment of the present disclosure, the table leg assembly further comprises a base, the base includes two longitudinal support rods respectively mounted at the lower end of the lower support member and a transverse support rod fixedly connected to the ends of the two longitudinal support rods on the same side.

In an embodiment of the present disclosure, the rectangular structure of the upper support member is further provided with a light strip support member, wherein the light strip support member is configured to provide a support force perpendicular to the ground for the light strip.

In an embodiment of the present disclosure, the light strip support member is a single support bar, wherein the single support bar is arranged in the middle of the rectangular structure.

In an embodiment of the present disclosure, the tabletop is rectangular, circular, or irregularly shaped.

In an embodiment of the present disclosure, the light strip is rectangular, circular, or irregularly shaped.

In an embodiment of the present disclosure, the light strip includes a battery module that can be equipped with batteries and/or a power cord plug that can be connected to an external power source.

In an embodiment of the present disclosure, the first table board and/or the second table board comprises at least two independent table units, wherein the table units are connected by a detachable connector and form a continuous tabletop surface.

In a second aspect of the present disclosure, another table is provided. The table comprises a tabletop, a table leg assembly, and a light strip, wherein the tabletop comprises a first table board and a second table board, and the first table board and the second table board are detachably connected; wherein both ends of the light strip are placed on a support mechanism and the light strip is disposed between the first table board and the second table board, and the support mechanism is fixed on the first table board and/or the second table board and/or the table leg assembly.

In an embodiment in a second aspect of the present disclosure, the first table board and/or the second table board comprises at least two independent table units, wherein the table units are connected by a detachable connector and form a continuous tabletop surface.

As described above, the table provided in embodiments of the present disclosure is provided with a gap to accommodate the light strip between the first table board and the second table board. The light strip can be fixed without adhesive tape and without the need to form grooves on the tabletop using the compression force in the horizontal direction between the first table board and the second table board or the support mechanism between the first table board and the second table board. Moreover, this table structure allows for easy installation and replacement of the LED light strip while also enabling dual-sided illumination, providing a good decorative effect.

Figure 1:
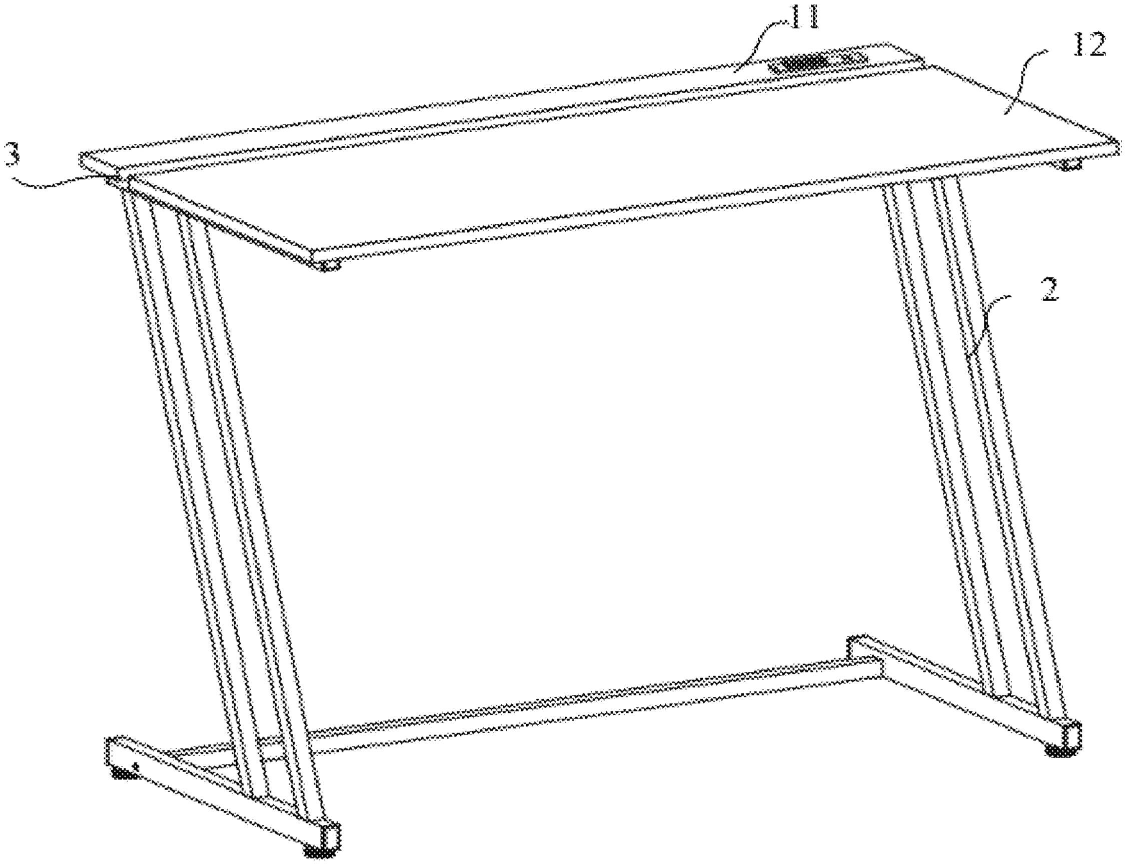
FIG. 1 shows a schematic structural diagram of a table in an embodiment of the present disclosure.

| | |
|---|---|
| 1 | Tabletop |
| 11 | First table board |
| 12 | Second table board |
| 121 | Table unit |
| 2 | Table leg assembly |
| 21 | Upper support member |
| 22 | Lower support member |
| 221 | Support rod |
| 23 | Base |
| 231 | Longitudinal support rod |
| 232 | Transverse support rod |
| 24 | Light strip support bar |
| 241 | Vertical support bar |
| 3 | Light strip |
| 4 | Support mechanism |

DETAILED DESCRIPTION OF THE INVENTION

Embodiments of the present disclosure are described below by way of specific examples, and those skilled in the art can readily appreciate other advantages and efficacies of the present disclosure by the content disclosed herein. The present disclosure may also be implemented or applied in other different specific embodiments, and various details in the present disclosure may be modified or altered according to different views and applications without departing from the spirit of the present disclosure. It is to be noted that the embodiments and the features in the embodiments in the present disclosure may be combined if no conflict will result.

The following detailed description of the embodiments of the present disclosure is provided with reference to the accompanying drawings, so that those skilled in the art to which the present disclosure belongs can easily implement them. The present disclosure may be implemented in many other different ways and is not limited to the embodiments illustrated herein.

In the present disclosure, reference to the terms “an embodiment”, “some embodiments”, “example”, “specific example”, or ‘some embodiments’ means that the specific features, structures, materials, or characteristics represented in the embodiment or example is included in at least one embodiment or example of the present disclosure. Moreover, the specific features, structures, materials, or characteristics indicated may be combined in any one or a group of embodiments or examples in a suitable manner. Without contradicting each other, those skilled in the art may combine different embodiments or examples and features in different embodiments or examples represented in the present disclosure.

In order to clearly illustrate the present disclosure, devices not related to the illustration are omitted, and the same reference numbers are given to the same or similar constituent elements in the specification throughout.

Throughout the specification, when a device is said to be “connected” to another device, this includes not only the case of “direct connection”, but also the case of “indirect connection” by placing other elements therebetween. In addition, when a device is said to “include” a certain constituent element, it does not mean that other constituent elements are excluded, but rather that other constituent elements may be included, as long as there is no statement to the contrary.

Although the terms “first”, “second”, and the like are used in some examples to denote various elements herein, these elements should not be limited by these terms. These terms are only used to distinguish one element from another. For example, a first interface and a second interface, etc. are indicated. Further, as used herein, the singular forms “one,” “a,” and “the” are intended to include the plural form as well, unless the context indicates otherwise. It should be further understood that the terms “comprise” and “include” indicate the presence of the described features, steps, operations, components, modules, items, types, and/or groups, and do not exclude the presence, occurrence, or addition of one or a group of other features, steps, operations, components, modules, items, types, and/or groups. The terms “or” and “and/or” as used herein are to be construed as inclusive or to mean any one or any combination. Thus, “A, B, or C” or “A, B, and/or C” means any of the following: A; B; C; A and B; A and C; B and C; A, B and C. Exceptions to this definition occur only when combinations of components, functions, steps, or operations are inherently mutually exclusive in certain ways.

Although not defined, all terms, including technical terms and scientific terms used herein, have the same meaning as generally understood by those skilled in the art to which the present disclosure belongs. Terms defined in commonly used dictionaries are further interpreted as having meanings consistent with relevant technical literature and the context of the present disclosure. Unless specifically defined, they should not be overly interpreted in an idealized or overly formal sense.

In a first aspect of the present disclosure, a table is provided. FIG. 1 to FIG. 4 illustrate the specific structure of the table. As shown in FIG. 1, the table comprises a tabletop 1, a table leg assembly 2, and a light strip 3. The tabletop comprises a first table board 11 and a second table board 12 detachably connected to each other. Both sides of the light strip 3 are disposed on the table leg assembly 2 and the light strip 3 is disposed between the first table board 11 and the second table board 12.

In the above embodiment, on the one hand, compared to the usual use of adhesive tape or the provision of grooves on the tabletop to secure the light strip, fixing the light strip between the two table boards can be realized by the compression forces in the horizontal direction exerted by the two table boards. On the other hand, the light strip, sandwiched between the two table boards of the tabletop, can illuminate spaces both above and below the table, providing a better decorative effect.

In some embodiments, the tabletop 1 is rectangular, circular, or irregularly shaped.

In some embodiments, the light strip 3 is rectangular, circular, or irregularly shaped. For example, in FIG. 4, the light strip 3 is a rectangular light strip 31.

For styling purposes, the shape of the tabletop 1 and the shape of the light strip 3 include, but are not limited to, rectangular, circular, and irregular shapes. The table can be made of leftover material, thereby increasing the utilization rate of the material.

In some embodiments, the first table board 11 and/or the second table board 12 comprises at least two independent table units 121, wherein the table units 121 are connected by a detachable connector and can form a continuous tabletop surface.

Specifically, multiple independent table units 121 detachably connected to each other can form a continuous tabletop surface, making table maintenance much easier. If one table unit 121 has an issue, only that unit needs to be removed for repair or replacement, without requiring the entire tabletop to be handled. This significantly reduces maintenance costs and time. Additionally, this design increases the flexibility of the table. Since the table units 121 are independent, the table’s layout can be adjusted as needed. For instance, if more tabletop space is required, the number of units can be increased; if less tabletop space is needed, the number of units can be decreased. This allows the table to be customized according to different usage scenarios and requirements. Furthermore, this design enhances the table’s aesthetic appeal. Each table unit 121 can be made from different materials, with different colors, or patterns, giving the table a unique design. Additionally, since the table units 121 are connected by detachable connectors, the style of the connectors can also be changed at any time according to personal preference, giving the table different visual effects.

Figure 2:
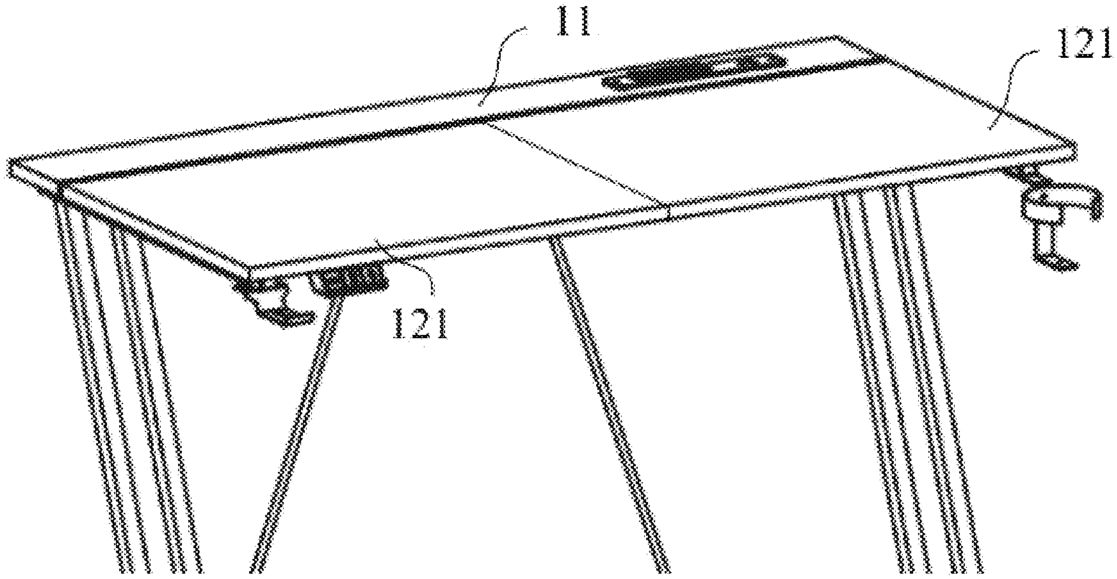
FIG. 2 shows a schematic structural diagram of a table in another embodiment of the present disclosure.

In an embodiment, as shown in FIG. 2, the second table board 12 is formed by two table units 121 detachably connected to each other.

Figure 3:
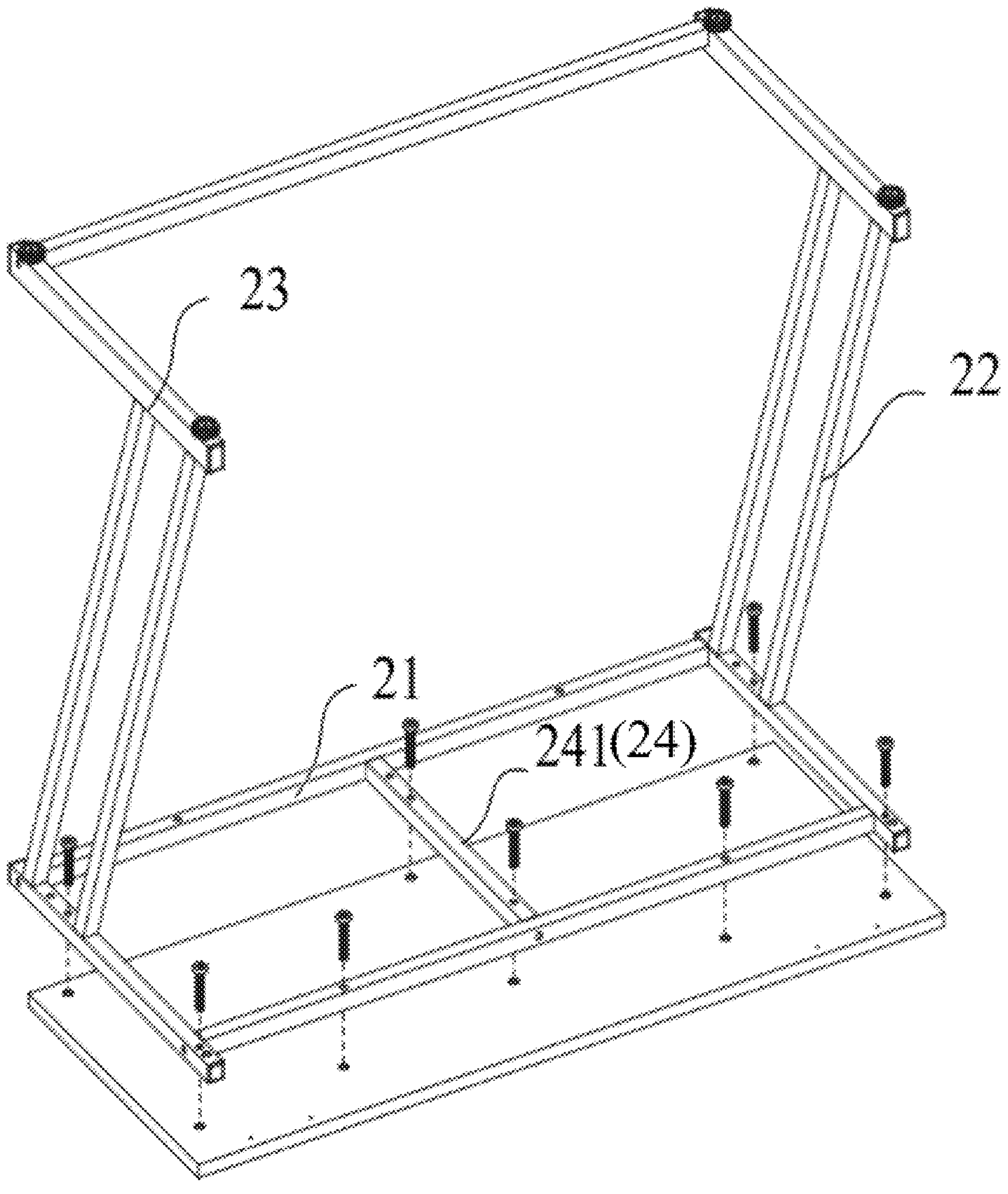
FIG. 3 shows a bottom view of a table in an embodiment of the present disclosure.

In some embodiments, as shown in FIG. 3, the table leg assembly comprises an upper support member 21 and a lower support member 22, wherein the upper support member 21 is mounted on the side of the tabletop 1 facing to the ground, and the lower support member 22 is coupled to the upper support member 21 by a fastener for providing an upward support force to the tabletop 1.

In a further embodiment, as shown in FIG. 3, the upper support member 21 has a rectangular structure, and the lower support member 22 comprises an even number of support rods, wherein the support rods are uniformly fixed on opposite sides along the circumference of the rectangular structure.

Specifically, as shown in FIG. 2, in order to increase the support strength of the table and make it more stable, the lower support member 22 comprises four support rods 221. Two of these rods are fixed on each of two opposite sides of the rectangular structure's circumference. Further, the light strip 3 is disposed on a top end of one of these two rods, so that the support rod can provide an upward support force to the light strip 3, making it more securely fixed.

Figure 4:
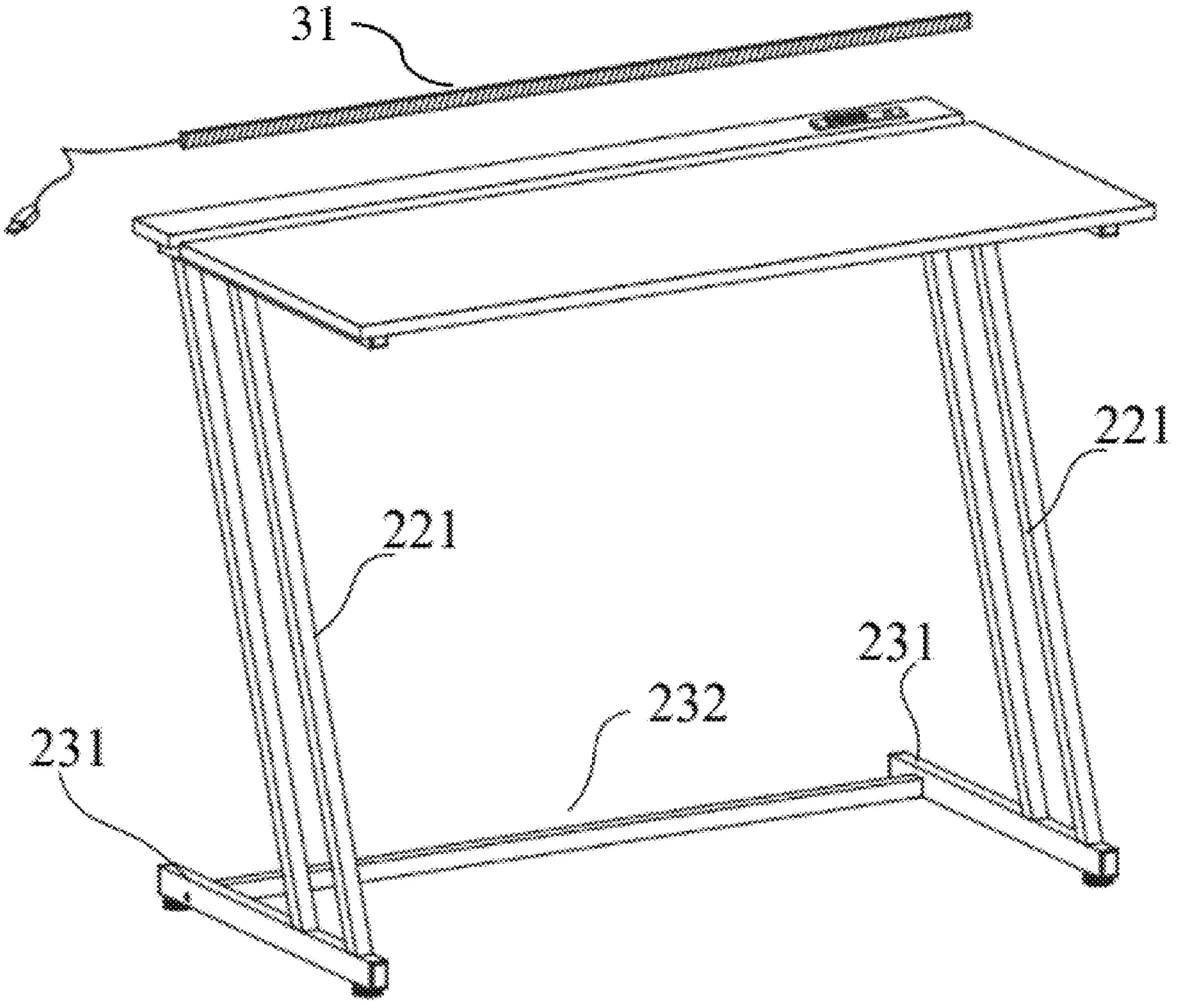
FIG. 4 shows a schematic structural diagram of a table in yet another embodiment of the present disclosure.

In some embodiments, as shown in FIG. 4, the support rods are not evenly distributed around the circumference of the rectangular structure of the upper support member 21, and the support rods are not perpendicular to the ground, that is the angles between the ground and the support rods are not 90 degrees. In such a case, a base 23 is further needed for the table leg assembly 2 to prevent the table from tilting forward when a user places a computer or other items on the tabletop 1. The base 23 comprises two longitudinal support rods 231 mounted respectively at the lower end of the lower support member 22, and a transverse support rod 232 fixedly connected to the ends of the two longitudinal support rods 231 on the same side. The transverse support rod 232 is mounted on a side away from the user's seating position. The base 23 has a notched rectangular structure, and it is of the same size as the rectangular structure of the upper support member 21, with the base positioned directly below the rectangular structure of the upper support member 21.

It is worth noting that in some embodiments the support rods are evenly distributed around the circumference of the rectangular structure of the upper support member 21 and perpendicular to the ground, whereupon the table can be stably placed on the ground without the need for a base 23. Therefore the inclined design of the lower support member 22 in some embodiments is to increase the visual attractiveness of the furniture.

In order to allow the light strip 3 to be fixed more firmly, in some embodiments, the rectangular structure of the upper support member 21 is also provided with a light strip support bar 24, wherein the light strip support bar 24 is configured to provide a support force perpendicular to the ground for the light strip. The light strip support bar 24 may be a single support bar 241, with the ends of the single support bar 241 being fixed to the first table board 11 and the second table board 12, respectively. Specifically, as shown in FIG. 3, the single support bar 241 is set in the middle of the rectangular structure (i.e., bisecting the upper support member 21).

In some embodiments, there may be multiple support rods 241, evenly distributed across the rectangular structure.

It is worth stating that the material of the light strip support bar 24 includes but is not limited to metal, wood, etc. The shape of the light strip support bar 24 includes but is not limited to rectangular and irregular shapes. For example, the light strip support bar 24 may be an irregularly-shaped iron sheet. As long as the light strip support bar 24 can span across the first table board 11, the light strip 3, and the second table board 12, and the ends of the light strip support bar 24 are fixed to the first table board 11 and the second table board 12, respectively, a better vertical upward support force for the light strip 3 can be provided, so as to effectively prevent the light strip 3 from falling.

In some embodiments, the light strip 3 comprises a battery module that can be equipped with batteries and/or a power cord plug that can be connected to an external power source, making the table more adaptable to different environments. This design enables the table to emit light even when there is no power source nearby.

The following steps for installing the table are described, wherein the screw serves as the fastener:

installing the second table board 12 on the table leg assembly 2; installing the first table board 11, wherein screws are not fully tightened; installing the light strip 3 between the first table board 11 and the second table board 12; and fully tightening all the screws and securing all the screws that were previously not tightened.

In a second aspect of the present disclosure, another table is provided. The table comprises a tabletop 1, a table leg assembly 2, and a light strip 3, wherein the tabletop 1 comprises a first table board 11 and a second table board 12, and the first table board 11 and the second table board 12 are detachably connected; wherein both ends of the light strip 13 are placed on two support mechanisms 4 and the light strip 13 is disposed between the first table board 11 and the second table board 12, and the support mechanisms 4 are fixed on the first table board 11 and/or the second table board 12 and/or the table leg assembly 2.

Figure 5:
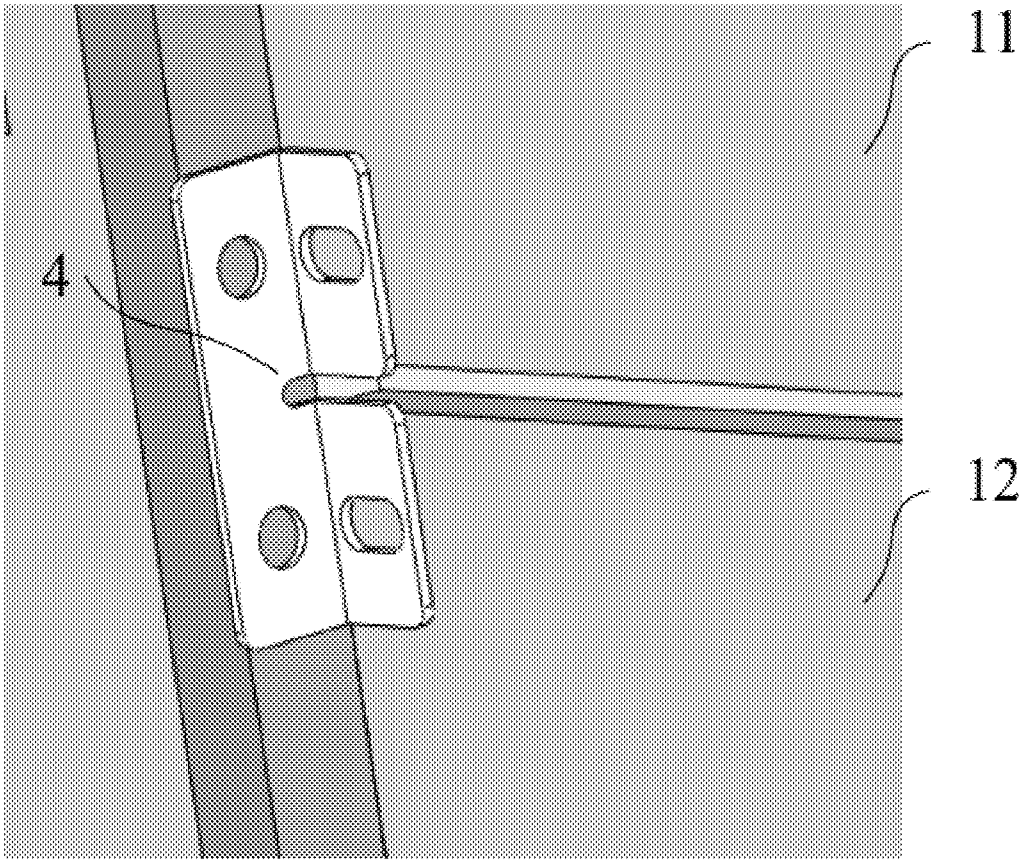
FIG. 5 shows a schematic diagram of a support mechanism of a table in an embodiment of the present disclosure.

Specifically, the first table board 11 and the second table board 12 are detachably connected to form the table surface. The two table boards can be connected together as needed to adapt to different length and width requirements. The light strip 3 is placed between the two table boards, with the support mechanisms 4 being fixed to the first table board 11, the second table board 12, and/or the table leg assembly 2; this design allows the light strip 3 to provide illumination without occupying tabletop space, while also serving as a decorative element for the table. The support mechanism 4 can have various forms. For example, as shown in FIG. 5, support plates or fittings can be added between the first and second table boards. These support plates or fittings can provide an upward support for the light strip, ensuring its stability. They can be made from different materials, such as metal, plastic, or wood, to meet various design and functional requirements.

Alternatively, adhesive tapes or similar adhesives can be applied to the surface of the first or second table board to fix the light strip onto the tabletop. This method is simple and effective, ensuring that the light strip does not move during use. Adhesive tapes can also be applied to the sides of the light strip, securing it to the tabletop surface. This approach not only fixes the light strip but also allows it to fit more closely to the tabletop, thereby enhancing stability.

In some embodiments, the first table board 11 and/or the second table board 12 comprises at least two independent table units 121, wherein the table units 121 are connected by a detachable connector and can form a continuous tabletop surface. It should be noted that more specific description of the table units can be found in the embodiments in the first aspect mentioned earlier.

In summary, a table is provided in the embodiments of the present disclosure, wherein the light strip is disposed between the first table board and the second table board, so that the first table board and the second table board can provide a horizontally-directed compression force on the light strip. Complex processes caused by forming grooves on the tabletop and insecure fixing caused by the adhesive tapes in the conventional situation are avoided. Moreover, this table structure can realize double-sided illumination of the light strip and has a better decorative effect. The light strip is fixed by the upper support member and the lower support member of the table leg assembly, and the light strip support bar is located at the upper support member, ensuring the stability and easy installation of the light strip.

The above embodiments are merely illustrative of the principles and effects of the present disclosure, and are not intended to limit the present disclosure. Any person familiar with the art may modify or change the above embodiments without violating the spirit and scope of the present disclosure. Therefore, all equivalent modifications or alterations made by a person having ordinary knowledge in the art without departing from the spirit and technical ideas disclosed herein shall be covered by the claims of the present disclosure.

The invention claimed is:

1. A table, comprising a tabletop, a table leg assembly, and a light strip, wherein the tabletop comprises a first table board and a second table board, and the first table board and the second table board are detachably connected; wherein both ends of the light strip are placed on the table leg assembly and the light strip is disposed between the first table board and the second table board;

wherein the table leg assembly comprises an upper support member and a lower support member; wherein the upper support member is mounted on a side of the tabletop facing the ground and has a rectangular structure; and the lower support member is connected to the upper support member by a fastener for providing an upward support force to the tabletop;

wherein the lower support member comprises an even number of support rods wherein the support rods are uniformly fixed on opposite sides along the circumference of the rectangular structure; and wherein the rectangular structure of the upper support member is further provided with a single light strip support bar located at a middle of the rectangular structure, and the single light strip support bar is configured to provide a support force perpendicular to the ground for the light strip.

2. The table of claim 1, wherein the lower support member comprises four support rods.

3. The table of claim 2, wherein the table leg assembly further comprises a base, wherein the base comprises two longitudinal support rods respectively mounted to a lower end of the lower support member and a transverse support rod fixedly connected to ends of the two longitudinal support rods on the same side.

4. The table of claim 1, wherein the tabletop is rectangular, circular, or irregularly shaped.

5. The table of claim 1, wherein the light strip is rectangular, circular, or irregularly shaped.

6. The table of claim 1, wherein the light strip comprises a power cord plug, wherein the power cord plug is configured to connect to an external power source.

7. The table of claim 1, wherein the first table board and/or the second table board comprises at least two independent table units, wherein the table units are connectable to form a continuous tabletop surface.

8. The table of claim 1, further comprising a support mechanism, wherein both ends of the light strip are also placed on the support mechanism, and the support mechanism is fixed on the first table board and/or the second table board and/or the table leg assembly.

9. The table of claim 8, wherein the first table board and/or the second table board comprises at least two independent table units, wherein the table units are connectable to form a continuous tabletop surface.

* * * * *